United States Patent

Deuring

[15] 3,651,861

[45] Mar. 28, 1972

[54] MOLD AND METHOD

[72] Inventor: Hans Deuring, Burscheid, Germany

[73] Assignee: Goetzewerke Friedrich Goetze Aktiengesellschaft, Burscheid, Germany

[22] Filed: Jan. 15, 1970

[21] Appl. No.: 3,093

[52] U.S. Cl. .................................165/1, 18/17 R, 18/17 C, 18/17 H, 100/93 P, 165/105, 165/168
[51] Int. Cl. .............................................F28d 15/00
[58] Field of Search ...............165/105, 107, 168; 100/93 P; 18/17 H, 17 C, 17 R

[56] References Cited

UNITED STATES PATENTS

| | | | |
|---|---|---|---|
| 2,837,180 | 6/1958 | Armstrong | 165/105 X |
| 3,152,774 | 10/1964 | Wyatt | 165/105 X |
| 3,229,759 | 1/1966 | Grover | 165/105 |
| 3,453,950 | 7/1969 | Pfeiffer | 100/93 |
| 3,478,192 | 11/1969 | Fink | 165/107 X |
| 3,481,439 | 12/1969 | Finkin | 165/105 X |

FOREIGN PATENTS OR APPLICATIONS

| | | | |
|---|---|---|---|
| 448,694 | 6/1936 | Great Britain | 165/168 |
| 1,033,223 | 7/1958 | Germany | 165/107 |

Primary Examiner—Albert W. Davis, Jr.
Attorney—Spencer and Kaye

[57] ABSTRACT

A compression mold having in its walls conduits containing sponge material and a substance wetting said sponge material. This equalizes the temperatures occurring in the mold and prevents the buildup of heat at internally situated parts of the mold.

A method of using conduits of the above-described type, which method involves placing such conduits in the walls of a mold, so that heat buildup and nonuniform temperatures in the mold are avoided.

15 Claims, 2 Drawing Figures

PATENTED MAR 28 1972 3,651,861

Inventor
Hans DEURING

By *Spencer & Kaye*

Attorneys

MOLD AND METHOD

BACKGROUND OF THE INVENTION

In vulcanizing rubber articles, the particular cadence at which a mold can be operated depends on the cyclic temperatures of the mold and on the time required for loading raw material and withdrawing a finished piece. In order to make the heating and cooling times as small as possible, the mold must exhibit the ability to rise very quickly in temperature, it must conduct heat rapidly and uniformly, and it must exhibit the ability to undergo very quick falls in temperature.

The speed with which the temperature of a mold can be decreased is also a very important factor in determining the speed at which thermoplastic can be formed into useful articles. The thermoplastic must first have solidified, before a mold can be opened for removal of a finished piece.

The molds of the prior art have been typically plagued by the danger that their central regions be overheated and this danger has continually limited the achievable operational speeds. To attempt to overcome this problem, especially for the production of foam-rubber articles, heating plates have been developed, made of light metal provided with channels. Heavy metal tubes have been drawn into such channels for the reception of a cooling or heating means. The problem with such procedure is its expense; it is furthermore difficult to assure constant and uniform heat transfer from the tubes into the plates.

It is also known to provide compression molds for forming plastics, which molds have heat exchange conduits in their walls. These conduits are fed with steam for curing purposes and with water for cooling. Heating and cooling times in such design are, however, relatively long, and the requisite boiler plant for producing the steam is expensive.

SUMMARY OF THE INVENTION

One object of the invention is to provide improved heat transfer between different parts of a mold, so that overheating can be prevented and operational speed can be increased.

Another object of the invention is to assure uniform and constant heat transfer parameters across conduit walls in a mold.

Yet another object of the invention is to provide a wholly self-contained temperature control system, so that the need for an external boiler plant is obviated.

These as well as other objects which will become apparent in the discussion that follows are achieved, according to the present invention, by a mold having conduits in its walls, the conduits containing a sponge material and a substance wetting the sponge material, and by the method of incorporating such conduits into a mold.

Description of the Preferred Embodiments

Figure 1:
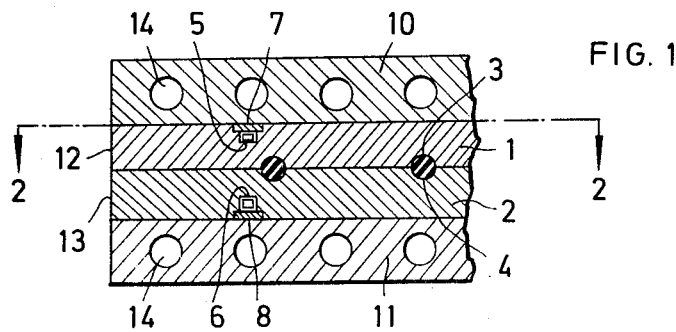
FIG. 1 is a cross-sectional view along the line 1—1 of FIG. 2.

The compression mold of the Figures is made up of an upper plate 1 and a lower plate 2. Both plates contain opposing recesses 3 and 4, the contour of which corresponds to the form of the article to be produced in this case rubber gaskets. The back sides of both plates contain milled grooves 5 and 6 which are hermetically sealed by metal strips 7 and 8 to provide interconnected conduits. The interior of the conduits is filled with sintered metal or ceramic powder forming a sponge material with interconnected pores. The pores contain an alkali metal salt which is liquid and wets the sponge material in the temperature range over which uniform mold temperatures are desired. With the sponge material and salt sealed in by strips 7 and 8, a wholly self-contained temperature control system is provided in the plates.

Figure 2:
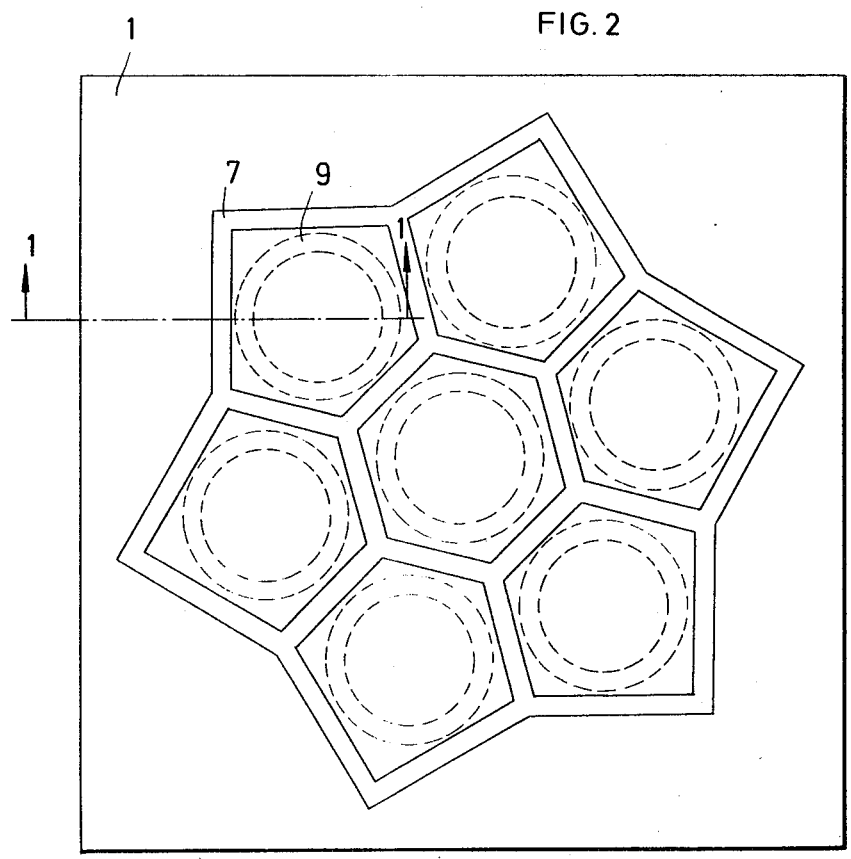
FIG. 2 is a view of FIG. 1 along the line 2—2 of FIG. 1.

FIG. 2 shows how the conduits are distributed through the mold which can form several gaskets at the same time in its cavities 9 formed by the opposing recesses 3 and 4.

Heating of the compression mold is by way of heating plates 10 and 11 which abut against the upper and lower plates 1 and 2 respectively as shown in FIG. 1. Since the coolest area is at edges 12 and 13, the danger existed in the prior art that an overheating would occur at the location of the central gasket, given proper temperature for the outermost gasket parts. The conduits of the present invention overcome this problem by providing for a uniform and rapid distribution of heat throughout the plates 1 and 2.

As noted above, it is preferred to make the conduits airtight. The conduits are evacuated and lined with a sponge material having very fine, interconnected capillary pores. Instead of the above-mentioned alkali metal salt, alkali metal or a working fluid of high capillarity may be used, depending on the particular combination of properties desired for a given application. The particular substance placed in the pores of the sponge must be liquid at least in the temperature range wherein temperature uniformity is desired. Wetting of the sponge material by the substance in the pores must be as high as possible, while viscosity of the substance must be as low as possible. The property of wetting is measured by the rise in a capillary of the sponge material - for a given inner diameter, the higher the rise, the higher the wetting. The technology and science of wetting is reviewed, for example, in "Physical Chemistry of Surfaces," by Arthur W. Adamson, Interscience Publishers, Inc., New York, 1960, pages 355 to 360.

The parameters of interfacial tension, contact angle on the sponge material, viscosity, heat conductivity, heat capacity, melting point, and boiling point of a given substance contribute to variation in suitability for any given application.

During a cooling stage of a forming operation, cooling plates can be supplied in place of the heating plates 10 and 11. The presence of the conduits of the present invention assures a rapid and uniform extraction of heat and a lowering of temperature. It can thus be seen that the entire operation of producing, for example, a vulcanized article, from the introduction of the raw material into the mold to its withdrawal as a finished article, can be significantly accelerated according to the present invention. Furthermore, the rapid heat transfer enables the cadence of operating a given mold for the repeated forming of an article to be increased over that which was previously possible.

The conduits of the present invention form a type of capillary pump. While they have been disclosed in the preferred embodiment of the Figures as being formed directly in the continuum of material bounding the mold cavities, it is of course within the idea of the invention to provide the conduits in separate plates abutting against plates 1 and 2. In such an embodiment, the plates containing the conduits are extensions of the walls of the mold.

As illustrated in FIG. 2, it is preferred to have parts of the conduits of the present invention radiate outwards to connect the centrally situated portions of plate 1 with the outer portions of the plate. In this way, heat may easily flow from the central portions radially outwards.

As shown in FIG. 2, the conduits are in the form of an interconnected network.

It is preferred to operate the heating plates with hot oil flowing through conduits 14 or with electrical resistance wires, rather than with steam, since steam leads to non-uniform heating as a result of variations in condensation along its path through the heating plates.

The lining of sponge material can be formed by sintered metal or ceramic powder. It can also be made from metal, glass or asbestos fibers or fabric. The substance in the pores of the sponge can be potassium, sodium, or lithium. The substance can also be a volatile hydrocarbon or other chemically stable liquid of low viscosity and high capillarity, whereby temperature ranges not covered by potassium, sodium or lithium can be achieved. The liquid substance in the sponge material also closely contacts the walls of the conduits of the present invention whereby constant and uniform heat transfer parameters are achieved.

It will be understood that the above description of the present invention is susceptible to various modifications, changes and adaptations, and the same are intended to be comprehended within the meaning and range of equivalents of the appended claims.

What is claimed is:

1. A mold suitable for the compression molding of rubber and plastic articles, comprising walls defining cavities for the reception of a material to be molded, said walls containing conduits lined with sponge material having interconnected capillary pores, said conduits containing additionally a substance wetting said sponge material, said conduits being in the form of an interconnected network.

2. A mold as defined in claim 1, said conduits being hermetically sealed and evacuated.

3. A mold as defined in claim 1, said sponge material being sintered metal or ceramic powder.

4. A mold as defined in claim 1, said sponge material being metal, glass, or asbestos fibers.

5. A mold as defined in claim 4, said sponge material being fabric.

6. A mold as defined in claim 1, said conduits radiating outwards from central portions of said walls.

7. A mold as defined in claim 6, said walls being in the form of plates, the mold further comprising heating plates abutting against said walls, the edges of the walls being the coolest area during heating.

8. A mold suitable for the compression molding of rubber and plastic articles, comprising walls defining cavities for the reception of a material to be molded, one of said walls being in the form of a plate, and a heating plate abutting against said wall plate, the edges of said wall plate being the coolest area during heating, said wall plate containing conduits radiating outwards from its central portions towards its edges, said conduits being lined with sponge material having interconnected capillary pores, said conduits containing additionally a substance wetting said sponge material, said conduits being in the form of an interconnected network.

9. A method for using an interconnected network of conduits lined with a sponge material having interconnected capillary pores and containing a substance wetting said sponge material at least within a predetermined temperature range, the method comprising forming said conduits in the walls of a mold, whereby heat is transferred from high temperature regions of said walls to low temperature regions of said walls at least within said predetermined temperature range.

10. A method as defined in claim 9, said conduits being hermetically sealed and evacuated.

11. A method as defined in claim 9, said sponge material being sintered metal or ceramic powder.

12. A method as defined in claim 9, said sponge material being metal, glass, or asbestos fibers.

13. A method as defined in claim 12, said sponge material being fabric.

14. A method as defined in claim 9, said conduits radiating outwards from central portions of said walls.

15. A method as defined in claim 14, said walls being in the form of plates, the mold further comprising heating plates abutting against said walls, the edges of the walls being the coolest area during heating.

* * * * *